United States Patent [19]

Derdall et al.

[11] Patent Number: 5,460,765

[45] Date of Patent: Oct. 24, 1995

[54] PROCESS FOR PAN GRANULATING A PARTICULATE MATERIAL

[76] Inventors: Gary Derdall, 158 Adons Coer, Saskatoon, Sask., Canada, S7K 5M7; Siu L. Ma, 332 Nahanni Drive, Saskatoon, Sask., Canada, S7K 4C7

[21] Appl. No.: 206,821

[22] Filed: Mar. 7, 1994

Related U.S. Application Data

[63] Continuation-in-part of Ser. No. 119,792, Aug. 9, 1993, abandoned, which is a continuation of Ser. No. 875,941, Apr. 30, 1992, abandoned.

[51] Int. Cl.$^6$ ............................................. B29B 9/08
[52] U.S. Cl. ............................... 264/117; 23/313 P
[58] Field of Search ................... 264/117, 37; 23/313 P

[56] References Cited

U.S. PATENT DOCUMENTS

| | | | |
|---|---|---|---|
| 3,206,528 | 9/1965 | Coombs et al. | 264/117 |
| 3,536,475 | 10/1970 | Trub | 264/117 |
| 3,711,254 | 1/1973 | McGowan et al. | 23/313 P |
| 3,853,490 | 12/1974 | Boeglin et al. | 264/117 |
| 4,131,668 | 12/1978 | Sasaki et al. | 264/404.4 |
| 4,264,543 | 4/1981 | Valenta | 264/37 |
| 4,344,747 | 8/1982 | Henry | 425/140 |
| 5,108,481 | 4/1992 | Shutt | 71/61 |

OTHER PUBLICATIONS

Chemical Engineers' Handbook, 5th ed, 1973, pp. 8–61 to 8–64.

*Primary Examiner*—Mary Lynn Theisen
*Attorney, Agent, or Firm*—Finnegan, Henderson, Farabow, Garrett & Dunner

[57] ABSTRACT

Industrial materials can be efficiently pan granulated by grinding the material to 95% minus 150 mesh, feeding this to a pan in conjunction with 1 to 15% seed materials and applying binder solution such that the free moisture content of the green ball is between 8–13% by weight of the feedstock. The granules build up on the seed to a desired size range, say −5 to +8 mesh, in an onion skin manner. Product is sent preferably to a fluid bed dryer for drying. The productivity and classification is very high with yields up to 95% for two mesh size ranges, such as −5 to +8 mesh.

23 Claims, No Drawings

PROCESS FOR PAN GRANULATING A PARTICULATE MATERIAL

CROSS-REFERENCE TO RELATED APPLICATIONS

This application is a continuation-in-part of application Ser. No. 08/119,792, filed Aug. 9, 1993, now abandoned, which is a continuation of application Ser. No. 07/875,941, filed Apr. 30, 1992, now abandoned.

BACKGROUND OF THE INVENTION

This invention relates to a process for pan granulation, a simple and novel mechanical configuration, and operation of the pan. The granulation process can be used with binders to produce narrowly sized granules of superior hardness and density with high efficiencies and production rates.

There are many patents in the prior art such as U.S. Pat. Nos. 3,711,254; 4,589,904; 4,743,289; D.E. 3,623,321; U.S.S.R. SU 1,567,558; DD 243,274; U.S.S.R. SU 1,468,890; PCT Int. Appl. WO 89 04,291-U.S. application Ser. No. 15,920 (Nov. 02, 1987). All these patents use different processes and mechanical arrangements to carry out granulation, yet almost without exception these patents are specific to one product, as with U.S. Pat. No. 3,711,254 or U.S.S.R. SU 1,468,890, both of which are specific to potash. In addition, the low yields of 20–50% experienced and claimed (e.g. U.S. Pat. No. 3,711,254) and the complexity of the mechanical circuits (previous citation) indicate that there is not an adequate understanding of the chemistry, physics and mechanical equipment in the current art to provide industry with the right technology.

Some patents have used the notion of a seed about which a core can be built up to produce a granule, such as U.S. Pat. No. 3,711,254 for potash or DE 3,623,321 for sugar. Neither patent teaches that if the process concept and mechanical flowsheet are properly done, a whole range of industrial materials can be economically granulated in high yield. The plethora of patents in the area of granulation along with the comparatively narrow range of products suitable for each patent is testimony to the need for a simple and effective system that can granulate a wide range of materials.

The objects of the invention are to achieve superior economic performance in the preparation of narrowly sized particles for a wide range of industrial materials. The narrowly sized particles can be produced over a wide span of granular mesh size ranges.

SUMMARY OF INVENTION

In this invention, art is disclosed whereby most any industrial material, including fertilizers, chemicals and minerals, may be granulated in very high yield by a new process that is used in conjunction with a specially designed pan granulation system.

Accordingly, this invention provides a process for pan granulating a particulate material, wherein the process comprises:

(a) providing particulate material having a size of about 95% minus 150 mesh and 90% minus 200 mesh or finer;

(b) feeding the particulate material from step (a) to a pan granulator containing about 1% to about 4% by weight seed material having a size of −14 to +35 mesh;

(c) feeding a binder solution to the pan granulator containing an amount of binder of about 0% to about 4% by weight of the particulate material; and treating the particulate material in the pan granulator to form an enlarged particulate material about 90% by weight or greater of which has a particle size distribution of about −5 to about +10 mesh.

The mesh sizes referred to herein are based on the Tyler Sieve Series.

It is believed that the unique aspects of the process along with the simplicity and process control facilitated by the mechanical circuit enables the production, in a uniform manner, of a wide range of industrial materials. From the experiments so far, it may be that most, if not all industrial materials can be economically granulated by these techniques.

DETAILED DESCRIPTION OF PREFERRED EMBODIMENTS

Many industrial materials need and in some cases are required to be marketed in a granular form that is stable to handling and various weather conditions. In one embodiment of the invention, the desired industrial material is first ground, preferably by an air sweep pulverizer or equivalent technology, to 95% minus 150 mesh and 90% minus 200 mesh. The material usually need not be ground any finer. Amy significant amounts of material in the +150 mesh range appear to serve as nuclei in granulation and disturb the process of controlled nucleation provided by this invention Water or binder solution is introduced by atomizing sprays at between 8–14% w/w, but preferably at 10–12%, by weight. Finer material can be handled as feedstock or product needs require, but the productivity of a given pan granulating system declines as the proportion of finer material increases. Finer material takes longer to build up an appropriately sized granule.

The material from the air sweep pulverizer can be conveyed to an active bottom hopper located at a height similar to the bottom of the pan granulator. The feedstock can then be metered with an auger onto the pan at about the 5 o'clock position so that there is minimal vertical drop. The feedstock flow rates are maintained at a uniform rate by the use of vibrators. Sometimes it is desirable to use about 2% moisture blended in the feedstock to prevent dusting of finer particulate material.

This process then introduces seed, typically between −14 and +28 mesh in size to control granule growth, at about the 1:30 position or behind a scraper at 2:30. The former seed can be moistened by water and/or binder solution added inboard of the three o'clock position with the pan spinning in a clockwise direction. Seed at the 2:30 position goes onto the pan in dry form. This additional point is used to minimize mutual agglomeration of seed in some cases. The powder feedstock for granulation is not fed to the pan at the same location on the pan as the seed. With seed addition outside the granulation bed in this manner, seed addition can be readily altered in response to changing conditions in the bed where increased or decreased growth may be required. With proper dust sizing and controlled seeding, high yields are obtained.

The wet seed directly from the 1:30 position and indirectly from the 2:30 position builds up the granule in a thin film or onion skin fashion until it is an appropriate size and discharged from the pan to a belt conveyor to a dryer. Although several types of dryers can be used, an appropriate piece of equipment is a Carrier fluidized bed dryer. After drying, the product is screened with on-size material going to a product bin.

The unique characteristic of this mechanically simple granulation system is that, for example, size yields of higher than 90% of −5 to +8 mesh product have been achieved on an 8 foot pan. Smaller mesh sizes can be made with finer seed and/or more seed crystals as noted before.

The materials in this application that have been studied range from very soluble materials, such as sodium and potassium chloride, which are also quite polar, to relatively insoluble material, such as potassium sulphate, to insoluble, nonpolar materials like elemental sulphur. Also, polar but relatively insoluble materials, like kaolin and magnesia and magnesium carbonates, can be granulated. Prior art does not teach that this wide range of materials can be processed into granules of variable but narrow size ranges and with no or minimal amounts of binder in high yield. For example, white potash can be made into large granules from 5 mesh to a half inch in a two step process with no The process concept used in this invention is granulating fine material in an onion skin or thin film fashion around a seed core which is −14 to +35 mesh, and preferably in the −14 to +28 mesh range. It may be more difficult to keep the granulation steady or stable with fine seed, such as −35 mesh. The seed should have a normal distribution of sizes in these ranges. A normal distribution would be the sizes formed in such a cut of an ammonium sulphate or potash standard product.

The granules produced by this process have a tiny but visible core from the seed material. Properly sized seed crystal is fundamental to the operation of this granulation process. Seed of large size forms granules of very poor strength. With a fixed feed rate and moisture content from the binder solution, the rate of flow and the precise sizing of the seed controls the granulation process of the pan. Fine seed sizes can be used, such as +35 mesh, but a point is reached where over-seeding or nucleation occurs easily and causes the final product yield to drop down. The seed material, as a practical matter, is usually prepared by taking material, such as standard grade potash or ammonium sulphate, and removing the −14 mesh and +28 mesh material for seed. Because of the usual size distribution of these materials, the bulk of the seed material is in the +20 to −28 mesh size range. Seed material in the range of 20 mesh is the best single point for each of control and uniformity of product size distribution, but it will be understood that 100% of material of this size may be difficult to obtain for practical reasons. Keeping a narrow size range for the seed will minimize the tendency for the product distribution to broaden. The more uniform the seed size, the more uniform in size that the product is. Overall product size is controlled by the amount and sizing of the seed. More seed and finer seed leads to smaller sized product. Thus, for example, with a given seed size, such as 20 mesh, a faster rate of addition to the pan alone will give a smaller size product. The process operates completely at room temperature, and this in itself distinguishes the process from much of the prior art, as with U.S. Pat. No. 3,711,254.

Product yields typically run 90% and higher. Yield is the weight percent of material out of the drier that is within granular specification. This is usually −5 mesh to +10 mesh. While this range is specified as generally applicable to this invention, the invention can produce 90% yields within two size ranges, such as −6 to +8 mesh or −8 to +10 mesh. For example, yields of 98% of −6 to +10 mesh material and yields of 95% of −5 to +8 mesh product can be obtained by the process of this invention. Some materials give better yields than others. Ammonium sulphate yields are typically 95% of −6 to +8 mesh material, whereas sulfur yields are about 90% of −6 to +10 mesh material.

The process of this invention enables full and complete process control of granulation by layering to produce products in a narrow size range in a single pass. Single pass means the primary yield with substantially no recycle employed. This enables the economic use of pan granulation for materials like fertilizers. In prior art pan granulation processes, recycle or multiple pass of growing balls has been required because the primary yield was only 25–40%. In the process of this invention, the primary yield of desired material is about 90% or more, and the off-spec material is usually 10–12 mesh size that can be sold as a smaller grade of product. This invention thus makes it possible to make high yields of on-spec material in a single pass without significant recycle.

The feedstock of fine material, which is also referred to herein as dust or powder, is 95% −150 mesh and preferably 90% −200 mesh. The powder feedstock for granulation to the pan can be finer than −200 mesh, and may need to be with say kaolin or sulphur; however, the productivity in t/hr of the pan decreases because more layers must be built up around the seed. Some materials, such as kaolin, are 2 micron in size and are very difficult to handle in bulk because they are so fine. Even this material can be granulated when properly metered to the pan. This requires increased residence time to achieve similarly sized granules. If the feedstock is predominantly −200 mesh material, it is possible to eliminate the air sweep pulverizer and go straight to a fines bin and then onto the pan. This could apply to material, such as flour, magnesium oxide and kaolin.

Additives, such as magnesium oxide, zeolites, or diatomite, can be added to the air sweep pulverizer to ensure that the pulverizer dust does not cake up due to moisture or electrostatic charges. Typical amounts are in the range of 0.05% to 0.5%. The use of such additives is part of the art to ensure that the granulation process works properly.

For stable operation of the pan in this granulation process, it is imperative that the feed to the pan be consistent in terms of mass per unit time as well as sizing. Pulsating feed rates will upset the pan and produce off-spec product. Depending upon the material, slugs of material will cause dust on the pan and produce a significant amount of off-size product if seed rate and moisture are not adjusted correctly.

The seed material is not critical in its composition and can be drawn from a range of materials when a suitable binder is employed. Seed material is usually taken from readily available material, such as standard product or fines from the production of potash or ammonium sulphate. Blends of material, such as ammonium sulphate and sulphur, can be granulated in high yields of 90% −5 to +10 mesh. Seed from the seed bin is fed to the granulation pan via a variable speed screw feeder. This is an important aspect to the overall process in terms of controlling the bed and the product produced from the pan. The feed rate of the seed is how the pan, the bed on the pan and the product yield are controlled provided that the dust feedstock rate and moisture are steady. Variable positioning of seed entry is critical to being able to granulate a wide range of materials.

Too much seed will result in more undersize product. Too little seed can result in a large amount of oversize product and fines. Thus, the seed feed rate and sizing are an important control variables. A change in the granular product size range can be achieved by changing the amount of seed to the pan. Industrial materials can be efficiently pan granulated by grinding the material to 95% −150 mesh, feeding this to a pan that contains 1% to 15% seed material by weight of powder fed to the pan, and applying binder if needed. The preferred seed feed rate is 1% to 4% by weight based on the weight of the dust fed to the pan granulator for seed in the +14 to −28 mesh range. Finer seed requires a lower percent seed because there are more nuclei. Thus, for example, seed of 28 mesh may only require 0.5% to 1% by weight seed, whereas seed of +14 mesh may require 5% or more seed. The seed feed rate and sizing are such that the process is controllable; the finer the seed, the less that is used, but due to small variations in seed rate, the pan becomes prone to inappropriate nucleation rates as seed size gets above 28 mesh, and this can lead to fines and lower yields. Thus, about 0.2% w/w may be required with +35 mesh seed. It is used to make short term adjustments to size distribution of the green balls to ensure that the product coming off the pan is on-spec. Addition of seed material will bring a pan to a granulation state in as little as 15 minutes on an 8 foot pan.

In some cases, an aqueous solution of the material being granulated can be used as a binder. In other cases, special binders must be used. In general, most conventional binders, such as starch, expanded starch or lignosulphonates, will work well as binders in this process. Because of the unique nature of this granulation process, sometimes no binder at all is needed.

If needed, binder can be fed to the pan via a series of sprayers. It has been found that atomizing sprayers in three parallel rows of two sprayers apiece gives sufficient operational flexibility to adjust for most variations in feed rate. The moisture is held to between 8% and 14% w/w with 10–12% being preferred for the broad range of materials tested. Water of hydration is considered as bound water since this process operates, uniquely, at room temperature. This means that overall water contents can be higher for some products.

Some binders, such as dried expanded starch or dried lignosulfonates, can be added with the feedstock to the pan. This can enable lumpy solids to be used as well as preclude plugging of spray nozzles due to binder.

When needed, the binder level can usually be kept at between 0.02% and 4% w/w, typically no more than 0.5 to 1% w/w, overall in the dry product and still achieve good product break strengths. Other systems typically use between 4 and 13% binder with 4–6% being common. With the low binder levels, and in some cases such as high grade potassium chloride where none is used, this process offers significant advantages in terms of required product purities, such as for fertilizers and industrial chemicals.

The process of this invention frequently needs no more than 0.02%–2% of common binders, such as hydrolyzed starch or lignosulphonates, to achieve granule break strength in the range of 6–9 pounds. This strength is twice the generally accepted values of 3–5 pounds for granular fertilizers. Break strength is the force required to fracture a particle. There are commercial devices available, wherein a single particle is placed in a device and a lever is used to apply force until the particle breaks. Break strength can also be approximated by placing weights on top of the particle on a balance until the particle breaks. Break strength is also affected by seed size. When seed of the specified size is employed in the process of the invention, the granules are quite strong with 6–8 pound break strengths and do not fracture easily.

In the process of this invention, the pan functions as a balling device in which granule growth occurs through internal recycle based upon controlled seeding to the pan and size segregating capability on the pan. Internal recycle refers to the growth of the wet granule or so-called green ball on the pan. Segregation means that small particles roll around the face of the pan picking up binder and moisture until they come to reside at the bottom of the granulation bed, growing gradually until they rise vertically to the surface of the bed, and then exit as product. If seeding, growth, and segregation do not properly occur, the pan produces a wide range of sizes due to a metastable bed. The pan may cycle from on-size to off-size product due in part to over and under nucleation. In the process of this invention, the green balls in a narrow size range grow on the pan and spill over in high yield because of correct feed stocks and geometric arrangements of the pan.

After the binder, seed and feed are properly mixed, a bed develops on the pan and product is driven off by centrifugal force. Having a deeper bed on the pan has some advantages in that it gives the system ballast from variations in feed rate and/or size. Variations in feed rate and size or feedstock composition variations can be accommodated by adjusting primarily the seed rate and secondary percentage of binder before significant amounts of off-spec product granules enter the drying system.

A 4 foot pan can be rotated at between 25 and 35 rpm to give good product densities, while an 8 foot pan has been found to operate well at between 12 and 18 rpm. An eight foot pan can be rotated at higher than 15 rpm and still produce high yields of on-spec product at higher production rates. Pans having a diameter of 12 feet are estimated to need rotational speeds of 8 to 12 rpm to provide a bed that will deliver product of the requisite density and break strength. Higher pan speeds are also important in generating increasing amounts of centrifugal force to produce granules with high bulk densities.

The bed itself can have its formation and stability enhanced by tilting the plane of the bed 0 to 10 degrees by dropping the side of the pan that you want the bed on. Facing the pan, this would be left side if the pan was rotating in a clockwise manner.

The feed rate of powder to the pan granulator depends upon the equipment size being employed and on the rate of granule growth. Pan granulators come in various sizes specified usually by diameter. Diameters range up to 22 feet and can take up to 15 to 20 tons per hour. Smaller pans, such as 8 foot diameter pan granulators, can take about 6 tons per hour. There is no overall preferred feed rate, except for the given pan diameter. It has been found that about 4 tons per hour on an 8 foot diameter pan granulator produces satisfactory results, but higher feed rates can be employed. The pan granulator can be of standard commercial design. Pan granulators manufactured by Ferrotech and Teledyne are suitable. It should be understood that for a given size pan granulator, this invention makes it possible to operate at higher feed rates than prior art processes, such as feed rates 20% to 30% higher, primarily because the output of on-spec material is high.

While the most important control variables on the pan are the rate of feed and sizing and location of addition of the seed crystal, an important and unique feature of a pan granulator over a drum granulator is the ability of the pan to segregate product and selectively remove on-size product. It has been observed that segregation of particles by size occurs across the face of the pan and vertically in the bed.

In this invention, the unit operation of segregation on the pan improves significantly with the addition of three pinch points or scrapers at the 9:30–10 o'clock position, and at the 11 and 1 o'clock positions. This is particularly desirable when increasing pan output beyond normal pan design parameters for a given output. The momentum of on-specification granules is broken by the pinch points and the granules cascade down to the bed across the face of the pan. Pans typically have two motor driven rotary scrapers at the 3 o'clock position. These are undesirable and are not needed in this invention. The motor driven scrapers impair the classification action of the pan.

If the pinch points are not there, on-size product can begin to rotate with the feed material, stick together and form large agglomerates. These agglomerates can impair the stable and efficient functioning of the bed and lead to oversize product. These pinch points on the pan, then, are essential to obtaining classification with the pan operating at higher pan speeds that yield higher throughput. This is part of the process of this invention and is used to ensure that high yields of evenly sized product come off the pan granulator.

In addition to the pinch points and lack of motorized scrapers impairing product segregation in a horizontal manner, introduction of seed at the 12:30–2:30 position, (either inboard or outboard) and downstream of the nominal 2 o'clock scraper is desirable. Dry seed comes into contact with wet dust in the bed, which is typically in the 6–9 o'clock position. With some materials this is the preferred method of retaining the seed in the bed until a desirable size is reached. Entry at the 2:30 position can be preferred for some materials where entry at the 1:30 position can cause significant seed agglomeration requiring high and undesirable levels of seed. When the seed entry is positioned apart from the entry of powder on the pan, the seed will not be directly consumed and destroyed by the powder, because the seed is on the bottom of the pan and will circulate and grow evenly.

While many steps can be taken to minimize process upsets, these do happen and the granulation process has to cope with it. A moving rake or similar device, and attached to the frame of the pan, scoops out any large balls that have been formed due to process upsets. These oversize balls must be removed from the bed so that they do not continue to agglomerate with smaller product. The larger balls can crush on specification and smaller product and prevent it from growing to on-size material.

Once on-size product moves off the pan, it goes by a stream to say a Carrier fluidized bed dryer. A reversible conveyor at the pan can be run in the other direction to dispose of off-spec material that can be formed during start-up or process upset. As noted earlier, the preferred dryer is a fluidized bed model, such as produced by Carrier of Louisville, Ky. Alternatively, a rotolouver dryer can be employed.

The dryer has exits for dust and product. The dust goes to recycle in binder sprays. With appropriate binders, the amount of dust is comparatively small amounting typically to 5% or less. Levels of 1 and 2% have been observed.

In one option from the dryer, the product is fed from the dryer directly to a product bucket elevator for screen sizing. Some products are inherently dusty and need reagentizing to ensure that there is minimal dusting on handling. Anticaking materials can also be added in the dedusting step. On-spec product can thus go to an intermediate reagentizing drum or directly to product storage. In another option, the product is surface coated right after the dryer. The process of this invention can, in general, be characterized as a continuous process. The pan granulation can be stopped and started easily, however, unlike prior art processes.

In a typical 10 tons per hour granulation process according to this invention, substantially dry seed material having a particle size of −14 to +28 mesh is fed at a rate of 0.2 tons/hr to the 12:30–2:30 position of a pan granulator. Binder solution is sprayed onto the granulator at about the 3:00 position at a rate of 1.05 tons/hr (0.75 t/hr of which is water). Powder material having a particle size of 90% −200 mesh is fed at a rate of 10.51 t/hr to the 5:00 position of the granulator. Enlarged particulate product is obtained as discharge from the pan at 90% yield. The product, before drying, contains 0.33 t/hr +5 mesh material; 10 t/hr −5 to +10 mesh material; 0.33 t/hr −10 to +14 mesh material; 0.17 t/hr −14 to +28 mesh material; 0.50 t/hr −28 mesh material; 0.75 t/hr water and binder of which 0.33 t/hr is binder solids. Unaccountable dust losses amount to 1%.

That completes the process description for material less than five mesh. It will be evident that the process of this invention makes it possible to prepare products having a narrow size distribution in high yield by controlled granule initiation with seeding and controlled granule growth through proper segregation leading to a stable granulation bed.

A similar but different circuit can be employed for producing granules greater than 5 mesh. Granules in the size of ½" and larger can be produced in this circuit by the addition of a rubber lined granulator located between the pan and the dryer.

Green balls of say −5 to +8 mesh are produced on the pan and the granulation is continued in the drum. In the same manner that seed crystals were used as the basis for producing normal sized granules, the strong and high density green balls from the pan act as a core for additional material to be added by means of drum granulation. This two step tandem approach avoids high operating costs of multiple low yield drying steps as well as avoiding high capital costs through the efficient use of equipment. If say 5–10 mesh material is available as a seed, it will be evident to those skilled in the art that this can be fed directly to the drum granulator and the mechanical circuit becomes quite simple and inexpensive.

In another embodiment, the granular product obtained by the process of this invention can be treated to further improve properties. For example, in the case of a water soluble crystalline salt, such as ammonium sulphate, potassium sulphate, or potash, if the granular product of this invention is treated with a hot brine wash of the same salt, such as in two or three stages in a drum granulator, and dried, the pore spaces inherent in granules of the product, sometimes referred to as void volume, become filled with the brine solute. This can lead to 5–15% w/w absorption giving very hard granules or granules with increased density. Additionally, reducing void volume in this manner significantly retards moisture uptake for more hygroscopic materials.

Granules comprised of a mixture of materials can be made in a similar manner by impregnating the granule with a different material. Upwards of about 15% w/w of the different material can be incorporated in the granule in this manner. For example, elemental sulfur can be added to potash to provide a fertilizer having two major nutrients. A surfactant, such as carboxylic acid, sulfonic acid or derivatives thereof, can be employed to enhance impregnation. These additives are also useful in preparing sulphur granules that form easily and disperse rapidly when exposed to moisture.

Many materials have been granulated with the above process/mechanical technology. A partial list includes potassium sulphate, ammonium sulphate, potassium chloride, ammonium chloride, sulphur, potash, magnesia, kaolin and soda ash. Other potential materials include coal, iron ore, various minerals, phosphates, nitrates, borates and carbonates. This invention makes it possible to granulate most any material. For example, plastics in a powder form that are high melting, could, with the use of appropriate solvent systems as binder solutions, be turned into granules that would be easy to handle and bulk store. Product has been successfully granulated on an 8 foot pan running at 3 T/HR, which is commercial scale, and larger volumes can readily be handled.

In summary, the invention provides:

1. A primarily room temperature process whereby fine mesh material, at 95% −150 mesh and at least 90% −200 mesh is produced by an air sweep pulverizer; this material is fed to a specially configured granulation pan at the 5:00 o'clock position along with seed crystals at the 12:30 to 2:30 o'clock position with the seed being primarily in the −14 to +28 mesh range; water or a binder solution is fed to the pan inboard of the 3 o'clock position. The seed picks up the dust and builds up in the pan bed until it is the right size and then is expelled to the dryer and product classification.

2. A drum granulator can be inserted between the pan and the dryer to make material larger than 5 mesh.

3. A composition of matter comprising nonhygroscopic binder potassium lignosulphonate is prepared typically from potassium sulphate and calcium lignosulphonate, although it can be prepared by potassium pulping or ion exchange between sodium, ammonium, magnesium and calcium lignosulphonate and potassium laden cation exchange resin. Alternatively nonhygroscopic binders can be made from cereal grains. These can be ground in the pulverizer and added at the 5:00 position on the pan with the particulate material. Moisture needed for granulation is then provided by water sprays, which will not plug due to the presence of binder.

4. The process can beneficially use magnesium oxide as anticake agent.

What is claimed is:

1. A process for pan granulating a particulate material, wherein the process comprises:
   (a) providing particulate material having a size of about 95% −150 mesh and 90% −200 mesh or finer;
   (b) feeding the particulate material from step (a) to a pan granulator containing about 0.02% to about 4% by weight seed material having a size of −14 to +35 mesh;
   (c) feeding a binder solution to the pan granulator in an amount of about 8% to about 14% by weight of the particulate material; and
   treating said particulate material in said pan granulator to layer the particulate material onto the seed material to form in a single pass an enlarged particulate material about 90% or more by weight of which has a particle size distribution of about −5 to about +10 mesh.

2. Process as claimed in claim 1, which further comprises drying said enlarged particulate material in a fluidized bed.

3. Process as claimed in claim 1, wherein said seed material has a size of −14 to +28 mesh.

4. Process as claimed in claim 1, wherein said seed material has a size of +20 to −28 mesh.

5. Process as claimed in claim 1, wherein said seed material is substantially dry.

6. Process as claimed in claim 1, wherein said binder is in an amount of about 1% to about 4% by weight of the particulate material.

7. Process as claimed in claim 1, wherein said binder is in an amount of about 0.02 to about 2% by weight of particulate material.

8. Process as claimed in claim 1, wherein said binder is in an amount of about 0.05 to about 1% by weight of particulate material.

9. Process as claimed in claim 1, wherein said enlarged particulate material has a particle size distribution of about −5 to about +8 mesh.

10. Process as claimed in claim 1, wherein said particulate material contains unbound water as a binder.

11. Process as claimed in claim 1, wherein said particulate material is substantially dry or moist as needed to prevent dusting on the pan.

12. A process of pan granulating a particulate material, wherein the process comprises:
    (A) feeding about 1% to about 4% by weight seed material having a size of about −14 to about +35 mesh to a rotatable pan granulator between about the 12:30–2:30 positions of the pan with the pan having pinch points at 9:00, 11:00 and 1:00;
    (B) feeding about 0 to about 4% of particulate material as binder in solution to the pan granulator using spray nozzles inboard of the 3:00 position of the pan;
    (C) feeding a powder material having a size of about 95% −150 mesh and about 90% −200 mesh or finer between the 5:00–9:00 positions on the pan; and
    (D) rotating the pan granulator under conditions to treat the powder material in the pan to layer the particulate material onto the seed material to form in a single pass an enlarged particulate material about 90% or more by weight of which has a particle size distribution of about −5 to about +10 mesh.

13. Process as claimed in claim 12, wherein the seed material has a size of about −14 to about +28 mesh.

14. Process as claimed in claim 12, wherein the seed material has a size of about −20 to about +28 mesh.

15. Process as claimed in claim 13, wherein said binder is water.

16. Process as claimed in claim 13, wherein the binder is fed to the pan granulator in an amount of about 0.02 to about 2% by weight of particulate material.

17. Process as claimed in claim 13, wherein the binder is fed to the pan granulator in an amount of about 0.05 to about 1% by weight.

18. A process of pan granulating a particulate material, wherein the process comprises:
    (A) feeding about 1% to about 4% by weight seed material having a size of about −14 to about +28 mesh to a rotatable pan granulator between about the 12:30–2:30 positions of the pan;
    (B) feeding about 0.5% to about 1% by weight of particulate material as binder solution to the pan granulator in-board of about the 3:00 position of the pan;
    (C) feeding a powder material having a size of about 95% −150 mesh and about 90% −200 mesh or finer between the 5:00–9:00 positions on the pan; and
    (D) rotating the pan granulator under conditions to treat the powder material in the pan to layer the particulate material onto the seed material to form in a single pass an enlarged particulate material about 90% or greater by weight of which has a particle size distribution of about −5 to about +10 mesh.

19. Process as claimed in claim 18, wherein said powder material is selected from the group consisting of potassium sulphate, ammonium sulphate, potassium chloride, ammonium chloride, sulfur, potash, magnesia, kaolin, and soda ash.

20. Process as claimed in claim 19, which further comprises treating the enlarged particulate material in aqueous salt solution to impregnate the enlarged particulate material with solute in the solution or with molten sulphur.

21. Process as claimed in claim 18, wherein conditioning agents selected from the group consisting of magnesium oxide, zeolites, and diatomites are used at the pulverization step, and carboxylic and sulphonic acids and derivatives thereof are used for sulphur granule formulation.

22. Process as claimed in claim 18, wherein binders selected from the group consisting of potassium lignosulphonate and cereal grains are used as non-hygroscopic binders.

23. The process of claim 1, wherein the amount of binder solution is 10% to 12% of the particulate material.

* * * * *

UNITED STATES PATENT AND TRADEMARK OFFICE
CERTIFICATE OF CORRECTION

PATENT NO. : 5,460,765
DATED : October 24, 1995
INVENTOR(S) : Gary DERDALL et al.

It is certified that error appears in the above-indentified patent and that said Letters Patent is hereby corrected as shown below:

COLUMN 10:

Line 29, after "0" insert --%--; and
Line 63, change "in-board" to --inboard--.

Signed and Sealed this

Second Day of January, 1996

*Attest:*

BRUCE LEHMAN

*Attesting Officer*  Commissioner of Patents and Trademarks